United States Patent [19]
Welch

[11] 3,949,488
[45] Apr. 13, 1976

[54] EDUCATIONAL ASSOCIATIVITY DOLL

[76] Inventor: Venus Lorraine Welch, 3041 Brighton St., Baltimore, Md. 21216

[22] Filed: Jan. 13, 1975

[21] Appl. No.: 540,658

[52] U.S. Cl. .................. 35/8 A; 35/35 C; 46/117
[51] Int. Cl.² .................. G09B 5/06; A63H 3/28
[58] Field of Search ............... 35/8 A, 35 R, 35 C; 46/117, 118, 175 AR

[56] References Cited
UNITED STATES PATENTS

| | | | |
|---|---|---|---|
| 3,017,187 | 1/1962 | Ryan | 46/118 X |
| 3,580,585 | 5/1971 | Stastny et al. | 46/118 X |
| 3,593,433 | 7/1971 | Dillon et al. | 35/35 R |
| 3,724,101 | 4/1973 | Slezak | 35/35 R |

Primary Examiner—William H. Grieb

[57] ABSTRACT

The doll consists primarily of a pliable body structure having on its interior a tape playback device which is activated by plaits attached to puff balls on the head of the doll and push buttons on the body structure, serve as alternate means for activating a tape playback device. Included with the doll is a colors and numbers book, a multiple number of flash cards, and a blanket for reinforcement.

10 Claims, 8 Drawing Figures

EDUCATIONAL ASSOCIATIVITY DOLL

This invention relates to educational devices, and more particularly to an educational associativity doll.

It is therefore the principal object to provide a doll which will aid in teaching numbers from one to ten, to children and will aid in teaching ten basic colors.

Another object of this invention is to provide a doll which will serve to improve a child's overall memory while simultaneously providing a surrogate companion for a child that is meaningful, interesting, stimulating and relevant.

Another object of this invention is to provide a doll of the type described, which will serve to integrate sensory approaches to learning and the doll will be of the rag type suitable for boys and girls, the doll being approximately 34 inches high.

Another object of this invention is to provide a doll of the type described, which will be of such structure so as to allow for flexibility while yet remaining firm enough to prevent dismemberment thereof.

A further object of this invention is to provide a doll of the type described, which will have on the interior of the head, a battery operated tape playback device, which will be activated by puff ball and plait means on the head of the doll.

A further object of this invention is to provide a doll of the type described which will have an exterior covering of a nature, that will resist tearing while still being comfortable to a child's touch. The hair of the doll will consist of the plurality of durable and soft feeling plaits having the puff balls secured, one each, at the end of each of the plaits.

A still further object of this invention is to provide a doll of the type described, which will be used in conjunction with, a colors and numbers book and a plurality of flash cards.

An even further objcet of this invention is to provide a doll of the type described, which will aid the child in learning the basic principals of addition. As an example, a child can easily observe the addition of three orange plaits and eight green plaits, equaling eleven plaits.

Other objects of the invention are to provide an educational associativity doll which is simple in design, inexpensive to manufacture, rugged in construction, easy to use and efficient in operation.

These and other objects will be readily evident upon a study of the following specification and the accompanying drawings, wherein:

FIG. 5 is a perspective view of a book for use with the doll.

Figures 1, 2:
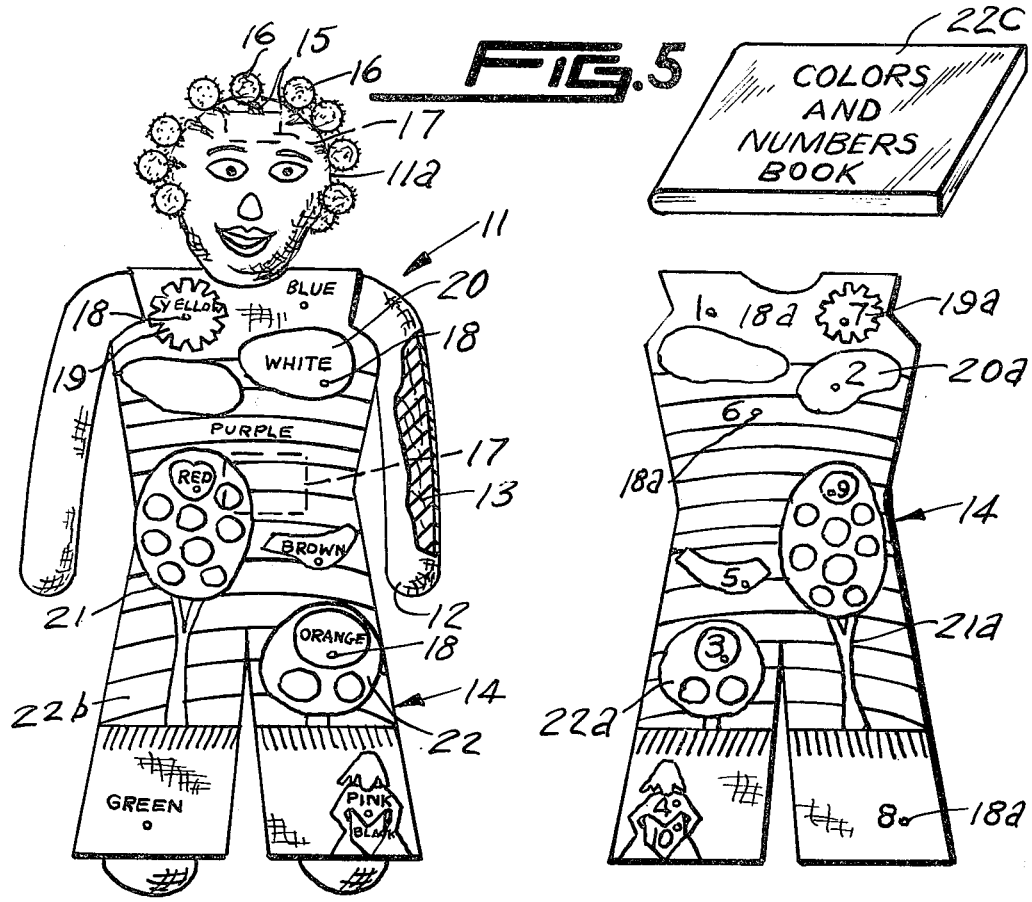
FIG. 1 is a front view of the present invention shown in elevation and partly broken away.
FIG. 2 is a plan view of the rear side of the garment shown removed from the doll.
Figure 3:
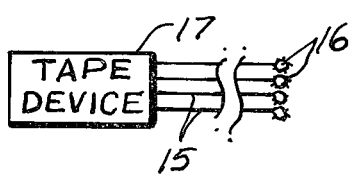
FIG. 3 is fragmentary plan view of the tape playback device shown removed from the doll.
Figure 4:
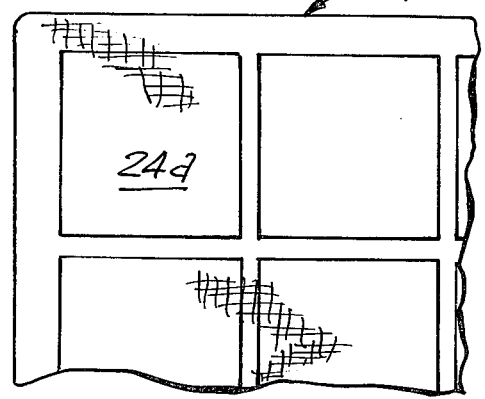
FIG. 4 is a fragmentary plan view of a blanket for use with the doll.
Figure 6:
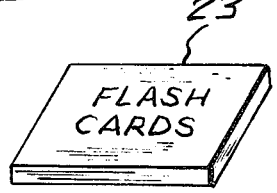
FIG. 6 is a perspective view of a plurality of cards for use with the doll.
Figure 7:
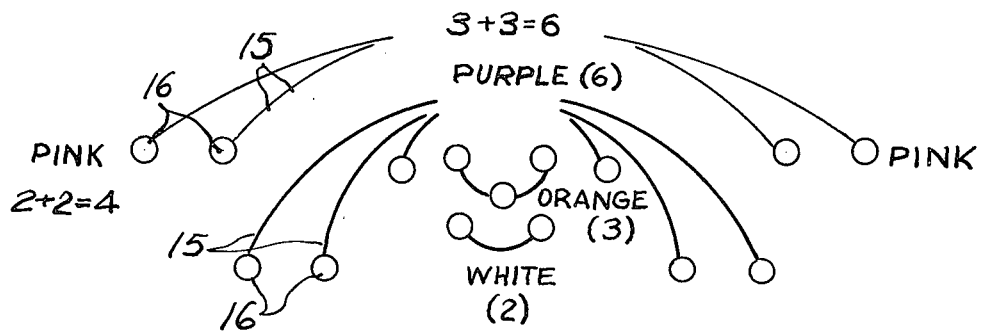
FIG. 7 is a diagramatic front view of plaits of the invention.
Figure 8:
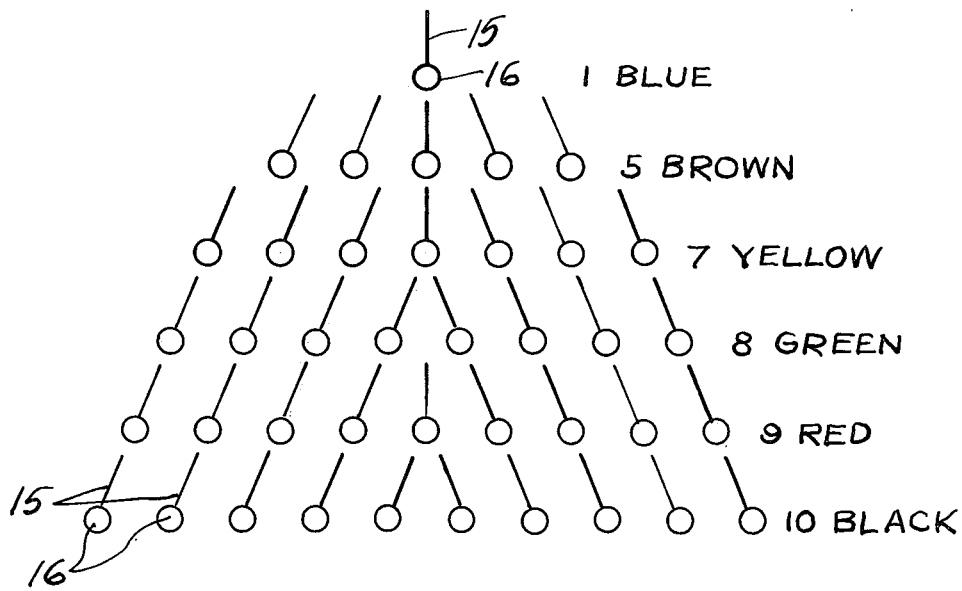
FIG. 8 is a diagramatic rear view of the plaits.

According to this invention, a doll 11 is shown to consist of a covering 12 which encases a suitable stuffing 13, the doll 11 being provided with a covering garment 14. On the head 11a of the doll 11 are a plurality of spaced apart plaits 15 to which are fixedly secured, one each, to a puff ball 16. When one of the puff balls 16 is pulled by the child, it will return to its normal length simultaneously when sound is emitted from the tape playback device 17. The tape playback device 17 is removably secured on the interior of doll head 11A in a suitable manner (not shown).

Extending from the body of doll 11 and through openings 18A are push buttons 19 which may serve as an alternate means of activating the tape playback device 17 if it is desired by the manufacturer when playback device 17 is secured within the body of doll 11. If body insulation of playback device 17 is desired, the push buttons 18 will serve as a means for activating the playback device 17 which will emit sound, calling out the rhyme associated with the particular push button 18 it represents upon the garment 14.

As will be seen in FIGS. 1 and 2 of the drawings, 19 and 19A represent the sun, yellow and the numerical character 7. 21 and 21A represent apples, red and the numerical character 9, and 22 and 22A represent oranges, orange and the numerical character 3, etc. The garment 14 is also provided with colored strips 22B, representing a rainbow spoken of in the rhyme, and other suitable configurations also spoken of in the rhyme.

The booklet 22C can be used to isolate ideas for younger children. Young children enjoy seeing pictures of familiar things in books. The early association with books is a good incentive for reading proficiency. Older children find they can learn the words they have heard so often and they enjoy the rewards of rote learning, capital and small letter discrimination which can be clearly seen in book 22C. Number words and objects depicted by the association would be written in all capital letters, such as, BLUE SKY and WHITE CLOUDS.

The flash cards 23 for educational reinforcement, have colored pictures printed thereon with numerical characters on the back of the flash cards 23 as shown in the colors and numbers book 22C. The flash cards 23 will be made of a sturdy plastic or other suitable material. When a card 23 is flashed, the child recites the associated rhyme. For an example, the front of a flash card 23 will have the picture of a suit and on the opposite side of that particular flash card 23, will be imprinted the numerical character 9, etc.

The blanket 24 also serves to provide educational reinforcement and blanket 24 is composed of crocheted squares 24A and is made from the same material from the plaits 15 so as to further associate colors and will serve as check means for memory retention.

After a puff ball 16 is pulled, the recorded voice is heard as the plait 15 recedes to its normal length. The taped voice verbalizes a rhyme associating color and a number. An example of what may be played from the playback tape device 17, is as follows:

I'm Eado doll and I love to chat, I yakety yak about this and that, I'll talk to you about my plaits.
1. Plait is blue, the sky is too.
2. Plaits are white, clouds keep out sunlight.
3. Plaits are orange, yes that's all. An orange is like a little ball.
4. Plaits are like my dress of pink, that's why the boys all wink.
5. Plaits are brown, birds make the sweetest sounds.

6. Plaits are purple as you know. Purple is my favorite color of the rainbow.
7. Plaits are yellow, sunshine makes the world so mellow.
8. Plaits are green like grass, daddy mowed the lawn so fast.
9. Plaits are red, eat an apple a day the doctor said.
10. Plaits are black, I'm like an almanac. That's why I keep track of all this yakety yak.

It shall be noted that three senses come into play as a child learns two skills simultaneously, touch, sight and sound. Numerical characters, colors and the associated vocabulary within the rhyme, reinforce each other tacitly, auditorily and visually, by using the one doll 11. These attributes render the doll 11 a useful substitute companion for a child during the formative years, the doll being useful from birth to the age of 10. The doll's qualities of comfort and flexibility make the doll emotionally as well as intellectually satisfying with a minimal danger of injury and the doll 11 may also serve as a pillow for the child.

The illustrations on the front of doll 11 correspond directly to illustrations on the rear so that the alternate use of the playback tape device is used on the interior of the body of doll 11, the button 18 is pressed or a cord is pulled directly on a figure such as the sun, the device 17 will be activated from either side.

It shall be recognized that doll 11 may be made so as to simulate any race desired.

What I claim is:

1. An educational associativity doll comprising:
   a stuffed body having head, trunk and limb portions;
   a garment on said body having front and back sides;
   said garment having a plurality of design areas on one of said sides bearing preselected different colors, and an equal plurality of similar design areas on the other of said sides bearing preselected different numbers, each of said color areas corresponding with a particular number area to establish a color-number correspondence;
   an audio playback means secured within said body;
   said audio playback means having a plurality of recorded messages equal to said plurality of color areas and therefore also equal to said plurality of number areas, each message relating a particular color to its corresponding number; and
   a plurality of activating means on said body for activating the playback means, each activating means causing the playback of a different recorded message;
   each activating means also being associated with the color area and corresponding number area whose relationship is played back when that activating means is activated;
   whereby a child will learn to associate numbers and colors by operating said activating means.
2. The combination of claim 1, wherein; each recorded message is a rhyme, a number of plaits corresponds to preselected number concepts and each rhyme correlates the number of plaits and color with the plaits providing a concrete instrument for number recognition and addition.
3. The combination of claim 1, wherein:
   the playback means is in the head of the doll;
   the numbers are in sequential order ranging from one to $n$; and
   each activating means comprises a plait on the head of the doll which is pulled to activate said playback means, there being one plait of the same color as the color area on the garment which corresponds with the number one, two plaits of the same color as the color area on the garment which corresponds with the number two, etc. up to $n$ plaits of the same color as the color area which corresponds with the number $n$;
   whereby when a plait of a selected color is pulled the recorded message which relates the selected color to its corresponding number will be played back.
4. The combination of claim 1, wherein:
   the playback means is in the trunk portion of the doll; and
   each activating means comprises a pair of activators, either one of which will activate said playback means, one of said pair being located within a color area on one side of said garment and the other of said pair being located within the corresponding number area on the other side;
   whereby when an activator in a selected color area or a selected number area is activated the recorded message relating the selected color or number to its corresponding number or color will be played back.
5. The combination of claim 1, wherein:
   said playback means comprises a tape playback device.
6. The combination of claim 1, further comprising:
   a color-and-numbers book, a plurality of flash cards and a blanket, said book, cards and blanket serving as reinforcement means for use with said doll.
7. The combination of claim 1, wherein there are ten color and number areas with the numbers ranging from one to ten and the color-number correspondence is:
   blue -1; white -2; orange -3; pink -4; brown -5; purple -6; yellow -7; green -8; red -9; black -10;.
8. The combination of claim 7, wherein the design areas comprise patches illustrating objects whose colors correspond to the colors of said color-number correspondence.
9. The combination of claim 8, wherein the color-number-object correspondence is:
   blue-1-sky; white-2-clouds; orange-3-orange; pink-4-dress; brown-5-bird; purple-6-rainbow; yellow-7-sun; green-8-grass; red-9-apple; black-10-almanac.
10. The combination of claim 9, wherein the recorded messages are in the form of rhymes, each rhyme reciting one of the colors and objects of said color-number-object correspondence.

* * * * *